(12) United States Patent
Trukhanovich

(10) Patent No.: US 11,608,058 B2
(45) Date of Patent: Mar. 21, 2023

(54) METHOD OF AND SYSTEM FOR PREDICTING FUTURE EVENT IN SELF DRIVING CAR (SDC)

(71) Applicant: YANDEX SELF DRIVING GROUP LLC, Moscow (RU)

(72) Inventor: Uladzislau Andreevich Trukhanovich, Luninets (BY)

(73) Assignee: YANDEX SELF DRIVING GROUP LLC, Moscow (RU)

( * ) Notice: Subject to any disclaimer, the term of this patent is extended or adjusted under 35 U.S.C. 154(b) by 160 days.

(21) Appl. No.: 17/126,945

(22) Filed: Dec. 18, 2020

(65) Prior Publication Data

US 2021/0197809 A1  Jul. 1, 2021

(30) Foreign Application Priority Data

Dec. 30, 2019 (RU) .......................... RU2019145092

(51) Int. Cl.
*B60W 60/00* (2020.01)
*B60W 30/095* (2012.01)
*G06T 7/70* (2017.01)

(52) U.S. Cl.
CPC .... *B60W 30/0956* (2013.01); *B60W 60/0015* (2020.02); *G06T 7/70* (2017.01); *B60W 2554/4041* (2020.02); *B60W 2554/80* (2020.02); *G06T 2207/30261* (2013.01); *G06T 2210/12* (2013.01)

(58) Field of Classification Search
CPC ......... B60W 30/0956; B60W 60/0015; B60W 2554/4041; B60W 2554/80; G06T 7/70; G06T 2207/30261; G06T 2210/12

USPC ......................................................... 701/23
See application file for complete search history.

(56) References Cited

U.S. PATENT DOCUMENTS

| 9,448,072 | B2 | 9/2016 | Bandyopadhyay et al. |
| 9,541,410 | B1 | 1/2017 | Herbach et al. |
| 10,303,178 | B1 | 5/2019 | Gutmann et al. |
| 10,354,406 | B2 | 7/2019 | Posner et al. |
| 10,360,714 | B1 | 7/2019 | Xue et al. |
| 2018/0144496 | A1* | 5/2018 | Posner ................. G06V 20/653 |

(Continued)

FOREIGN PATENT DOCUMENTS

RU  2015141344 A  4/2017

*Primary Examiner* — Tyler J Lee
*Assistant Examiner* — Tiffany P Ohman
(74) *Attorney, Agent, or Firm* — BCF LLP

(57) ABSTRACT

Methods and devices for generating a trajectory for a self-driving car (SDC) are disclosed. The method includes: for a given one of the plurality of trajectory points of a given trajectory: (i) determining a presence of plurality of dynamic objects around the SDC, (ii) applying a first algorithm to determine a set of collision candidates, (iii) generating a segment line for the SDC, (iv) generating a bounding box for each of set of collision candidates, (v) for a given one of the set of collision candidates, determining a distance between the segment line and the respective bounding box to determine a separation distance, (vi) in response to the separation distance being lower than a threshold, determining that the given one of the set of collision candidates would cause the collision with the SDC, (vii) amending at least one of the plurality of trajectory points to render a revised candidate trajectory.

20 Claims, 10 Drawing Sheets

(56) References Cited

U.S. PATENT DOCUMENTS

2018/0349746 A1* 12/2018 Vallespi-Gonzalez ........................ G06V 20/58
2019/0317519 A1   10/2019 Chen

* cited by examiner

METHOD OF AND SYSTEM FOR PREDICTING FUTURE EVENT IN SELF DRIVING CAR (SDC)

CROSS-REFERENCE

The present application claims priority to Russian Patent Application No. 2019145092, entitled "Method of and System for Predicting Future Event in Self Driving Car (SDC)", filed Dec. 30, 2019, the entirety of which is incorporated herein by reference.

FIELD OF TECHNOLOGY

The present technology relates to computer-implemented methods and systems for computer-assisted cars, and more specifically, to methods and systems for predicting future event in self driving car.

BACKGROUND

Fully or highly automated driving systems may be designed to operate a vehicle on the road without driver interaction (e.g., driverless mode) or other external control. For instance, self-driving vehicles and/or autonomous vehicles are designed to operate a vehicle in a computer-assisted manner.

An autonomous vehicle is configured to traverse a planned path between its current position and a target future position without (or with minimal) input from the driver. Nearby/neighboring vehicles can travel along paths or trajectories that can intersect with the planned trajectory of the autonomous vehicle. This is especially true when the autonomous vehicle approaches an intersection.

Some systems are able to generate a planned trajectory for an autonomous vehicle for navigating through an intersection. However, in order to operate safely and efficiently at an intersection or elsewhere on the road, computer systems should take into account priorities of nearby/neighboring vehicles for decision making.

SUMMARY

Developers of the present technology have realized that prior art solutions have drawbacks.

In a first broad aspect of the present technology, there is provided a method for generating a trajectory for a self-driving car (SDC). The SDC is associated with an electronic device. The method is executable by the electronic device. The method comprises generating, by the electronic device, a candidate trajectory for the SDC, and where the candidate trajectory for the SDC has a plurality of trajectory points. The method comprises, for a given one of the plurality of trajectory points, determining, by the electronic device, a presence of plurality of dynamic objects around the SDC at the given one of the plurality of trajectory points. The method comprises, for a given one of the plurality of trajectory points, applying, by the electronic device, a first algorithm to determine a set of collision candidates. The set of collision candidates is a subset of the plurality of dynamic objects. The set of collision candidates is associated potentially causing a collision with the SDC when the SDC is at the given one of the plurality of trajectory points. The method comprises generating, by the electronic device, a segment line representation of the SDC. The method comprises generating, by the electronic device, a respective bounding box around each of the set of collision candidates. The method comprises, for a given one of the set of collision candidates, determining, by the electronic device, a distance between the segment line and the respective bounding box to determine a separation distance between the SDC and the given one of the set of collision candidates. The determining the distance includes (i) applying, by the electronic device, a second algorithm to determine a subset of sides of the respective bounding box to analyze and (ii) the determining the distance is based on only the subset of sides of the respective bounding box and the segment line. The method comprises in response to the separation distance between the given one of the set of collisions candidates and the SDC being lower than a pre-determined threshold, determining that the given one of the set of collision candidates would cause the collision with the SDC if the SDC following the candidate trajectory. The method comprises amending, by the electronic device at least an associated given one of the plurality of trajectory points of the candidate trajectory to render a revised candidate trajectory.

In some embodiments of the method, the pre-determined threshold is half of a width of the SDC.

In some embodiments of the method, the width is a largest width of the SDC.

In some embodiments of the method, the applying the first algorithm comprises applying a grid, where the grid has a cell with pre-determined size.

In some embodiments of the method, to determine the set of collision candidates the method further comprises determining the set of collision candidates that are located within a pre-determined number of cells away from a cell associated with the SDC.

In some embodiments of the method, the method further comprises pre-determining the pre-determined size.

In some embodiments of the method, the pre-determining is based on balancing a processing speed and a number of potential false positives.

In some embodiments of the method, the generating the segment line comprises: (i) selecting a front point that is a mid-point along a front bumper of the SDC, (ii) selecting a back point that is the mid-point of a back bumper of the SDC, (iii) drawing a line through the front point and the back point, and (iv) selecting two cut off points along the line to define the segment line, the cut off points being selected such that a circle with a radius of the pre-determined threshold would encompass each point of the SDC, in the front bumper and the back bumper of the SDC, respectively.

In some embodiments of the method, the applying the second algorithm comprises, for the respective bounding box of the given one of the set of collision candidates, determining a coordinate system by: (i) defining a longitudinal axis through a longitudinal midpoint at sides of the respective bounding box and a transverse axis through a transverse midpoint at a front and a back of the respective bounding box, and such that (ii) the coordinate system has a zero point at a crossing of the longitudinal axis and the transverse axis.

In some embodiments of the method, the applying the second algorithm further comprises projecting the segment line on the longitudinal axis and the transverse axis to define a projected position of the segment line in the coordinate system.

In some embodiments of the method, the method further comprises applying at least one heuristic to the projected position and the longitudinal axis and the transverse axis.

In some embodiments of the method, at least one heuristic comprises one of: (i) in response to the projected position being entirely on one of: (i) a left side, a right side, a front side, and a back side; the subset of sides of the respective bounding box comprises only the one of the left side, the right side, the front side, and the back side; (ii) in response to the projected position being entirely on one of: a left side, a right side, a front side, and a back side; the subset of sides of the respective bounding box comprises only the one of the left side, the right side, the front side, and the back side; (iii) in response to the projected position being inside one of a horizontal corridor and a vertical corridor; checking the subset of sides of the respective bounding box comprises a single side of the bounding box; (iv) in response to the projected position being outside both of the horizontal corridor and the vertical corridor; checking the subset of sides of the respective bounding box comprises a single corner of the bounding box; (v) in response to the projected position intersecting with an X axis of the system of coordinates, then the subset of sides comprises an intersection point of the segment line with the X axis.

In some embodiments of the method, the set of collision candidates is smaller than the plurality of dynamic objects around.

In some embodiments of the method, the subset of sides of the respective bounding box is smaller than four.

In some embodiments of the method, the subset of sides of the respective bounding box is two.

In a second broad aspect of the present technology, there is provided an electronic device for generating a trajectory for a self-driving car (SDC). The SDC is associated with the electronic device. The electronic device is configured to generate a candidate trajectory for the SDC, and where the candidate trajectory for the SDC has a plurality of trajectory points. The electronic device is configured to, for a given one of the plurality of trajectory points, determine a presence of plurality of dynamic objects around the SDC at the given one of the plurality of trajectory points. The electronic device is configured to, for a given one of the plurality of trajectory points, apply a first algorithm to determine a set of collision candidates, the set of collision candidates being a subset of the plurality of dynamic objects. The set of collision candidates is associated potentially causing a collision with the SDC when the SDC is at the given one of the plurality of trajectory points. The electronic device is configured to generate a segment line representation of the SDC. The electronic device is configured to generate a respective bounding box around each of the set of collision candidates. The electronic device is configured to, for a given one of the set of collision candidates, determine a distance between the segment line and the respective bounding box to determine a separation distance between the SDC and the given one of the set of collision candidates. To determine the distance the electronic device is configured to apply a second algorithm to determine a subset of sides of the respective bounding box to analyze. The determination of the distance by the electronic device is based on only the subset of sides of the respective bounding box and the segment line. The electronic device is configured to, in response to the separation distance between the given one of the set of collisions candidates and the SDC being lower than a pre-determined threshold, determine that the given one of the set of collision candidates would cause the collision with the SDC if the SDC following the candidate trajectory. The electronic device is configured to amend at least an associated given one of the plurality of trajectory points of the candidate trajectory to render a revised candidate trajectory.

In some embodiments of the electronic device, the pre-determined threshold is half of a width of the SDC.

In some embodiments of the electronic device, the width is a largest width of the SDC.

In some embodiments of the electronic device, the electronic device configured to apply the first algorithm comprises the electronic device configured to apply a grid, where the grid has a cell with pre-determined size.

In some embodiments of the electronic device, to determine the set of collision candidates the electronic device is further configured to determine the set of collision candidates that are located within a pre-determined number of cells away from a cell associated with the SDC.

In some embodiments of the electronic device, the electronic device is further configured to pre-determine the pre-determined size.

In some embodiments of the electronic device, the electronic device configured to pre-determine is based on balancing a processing speed and a number of potential false positives.

In some embodiments of the electronic device, the electronic device configured to generate the segment line comprises the electronic device configured to: select a front point that is a mid-point along a front bumper of the SDC, select a back point that is the mid-point of a back bumper of the SDC, draw a line through the front point and the back point, and select two cut off points along the line to define the segment line, the cut off points being selected such that a circle with a radius of the pre-determined threshold would encompass each point of the SDC, in the front bumper and the back bumper of the SDC, respectively.

In some embodiments of the electronic device, to apply the second algorithm comprises the electronic device configured to, for the respective bounding box of the given one of the set of collision candidates, determine a coordinate system by defining a longitudinal axis through a longitudinal midpoint at sides of the respective bounding box and a transverse axis through a transverse midpoint at a front and a back of the respective bounding box, and such that the coordinate system having a zero point at a crossing of the longitudinal axis and the transverse axis.

In some embodiments of the electronic device, the electronic device configured to apply the second algorithm further comprises the electronic device configured to project the segment line on the longitudinal axis and the transverse axis to define a projected position of the segment line in the coordinate system.

In some embodiments of the electronic device, the electronic device is further configured to apply at least one heuristic to the projected position and the longitudinal axis and the transverse axis.

In some embodiments of the electronic device, at least one heuristic comprises one of: (i) in response to the projected position being entirely on one of: (i) a left side, a right side, a front side, and a back side; the subset of sides of the respective bounding box comprises only the one of the left side, the right side, the front side, and the back side; (ii) in response to the projected position being entirely on one of: a left side, a right side, a front side, and a back side; the subset of sides of the respective bounding box comprises only the one of the left side, the right side, the front side, and the back side; (iii) in response to the projected position being inside one of a horizontal corridor and a vertical corridor; checking the subset of sides of the respective bounding box comprises a single side of the bounding box; (iv) in response to the projected position being outside both of the horizontal corridor and the vertical corridor; checking the subset of sides of the respective bounding box comprises a single corner of the bounding box; (v) in response to the projected position intersecting with an X axis of the system of coordinates, then the subset of sides comprises an intersection point of the segment line with the X axis.

In some embodiments of the electronic device, the set of collision candidates is smaller than the plurality of dynamic objects around.

In some embodiments of the electronic device, the subset of sides of the respective bounding box is smaller than four.

In some embodiments of the electronic device, the subset of sides of the respective bounding box is two.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
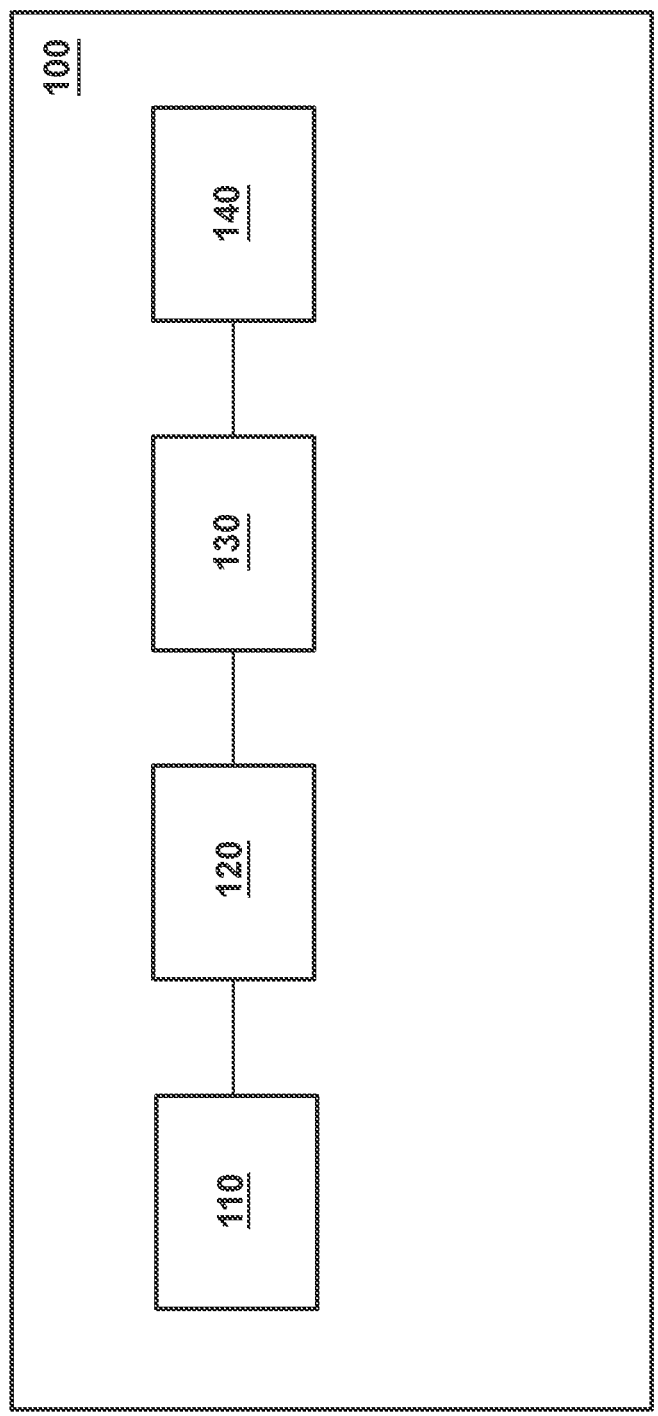
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology.

Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labelled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is depicted a computer system 100 suitable for use with some implementations of the present technology, the computer system 100 comprising various hardware components including one or more single or multi-core processors collectively represented by processor 110, a solid-state drive 120, a memory 130, which may be a random-access memory or any other type of memory. Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled.

In at least some embodiments of the present technology, the solid-state drive 120 stores program instructions suitable for being loaded into the memory 130 and executed by the processor 110 for determining a presence of an object. For example, the program instructions may be part of a vehicle control application executable by the processor 110.

In at least some embodiments of the present technology, it is contemplated that the computer system 100 may have additional and/or optional components, such as a network communication module 140 for communication, via a communication network (for example, a communication network 240 depicted in FIG. 2) with other electronic devices and/or servers, localization modules (not depicted), and the like.

Networked Computer Environment

Figure 2:
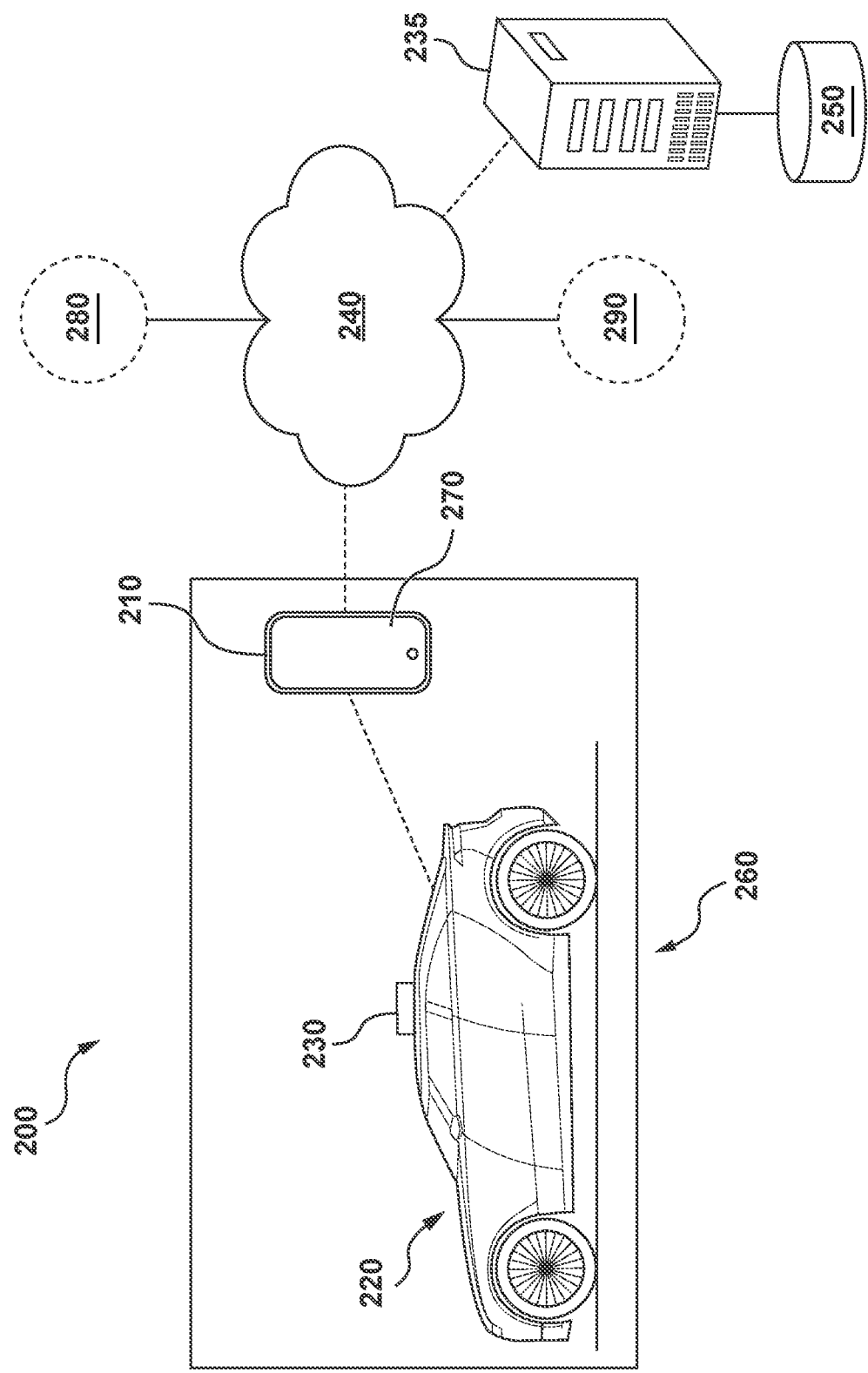
FIG. 2 depicts a networked computing environment being suitable for use with some implementations of the present technology.

FIG. 2 illustrates a networked computer environment 200 suitable for use with some embodiments of the systems and/or methods of the present technology. The networked computer environment 200 comprises an electronic device 210 associated with a vehicle 220, or associated with a user (not depicted) who can operate the vehicle 220, a server 235 in communication with the electronic device 210 via the communication network 240 (e.g. the Internet or the like, as will be described in greater detail herein below). Optionally, the networked computer environment 200 can also include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220, with which the electronic device 210 is associated, may comprise any leisure or transportation vehicle such as a private or commercial car, truck, motorbike or the like. The vehicle may be user operated or a driver-less vehicle. It should be noted that specific parameters of the vehicle 220 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2× or 4×), tyre type, brake system, fuel system, mileage, vehicle identification number, and engine size.

The implementation of the electronic device 210 is not particularly limited, but as an example, the electronic device 210 may be implemented as a vehicle engine control unit, a vehicle CPU, a vehicle navigation device (e.g. TomTom™, Garmin™), a tablet, and a personal computer built into the vehicle 220 and the like. Thus, it should be noted that the electronic device 210 may or may not be permanently associated with the vehicle 220. Additionally or alternatively, the electronic device 210 can be implemented in a wireless communication device such as a mobile telephone (e.g. a smart-phone or a radio-phone). In certain embodiments, the electronic device 210 has a display 270.

The electronic device 210 may comprise some or all of the components of the computer system 100 depicted in FIG. 1. In certain embodiments, the electronic device 210 is on-board computer device and comprises the processor 110, solid-state drive 120 and the memory 130. In other words, the electronic device 210 comprises hardware and/or software and/or firmware, or a combination thereof, for determining a trajectory of the vehicle 220 at a given road segment considering obstacles therein, as will be described in greater detail below.

Sensor System

In the non-limiting embodiments of the present technology, the electronic device 210 comprises or has access to a sensor system 230. According to these embodiments, the sensor system 230 may comprise a plurality of sensors allowing for various implementations of the present technology. Examples of the plurality of sensors include but are not limited to: cameras, LIDAR sensors, and RADAR sensors, etc. The sensor system 230 is operatively coupled to the processor 110 for transmitting the so-captured information to the processor 110 for processing thereof, as will be described in greater detail herein below.

The sensor system 230 can be mounted on an interior, upper portion of a windshield of the vehicle 220, but other locations are within the scope of the present disclosure, including on a back window, side windows, front hood, rooftop, front grill, or front bumper of the vehicle 220. In some non-limiting embodiments of the present technology, the sensor system 230 can be mounted in a dedicated enclosure (not depicted) mounted on the top of the vehicle 220.

Further, the spatial placement of the sensor system 230 can be designed taking into account the specific technical configuration thereof, configuration of the enclosure, weather conditions of the area where the vehicle 220 is to be used (such as frequent rain, snow, and other elements) or the like.

In the non-limiting embodiments of the present technology, the sensor system 230 may comprise a sensor configured to capture an image of a surrounding area 260. In this regard the sensor system 230 may be a camera or a plurality thereof (not separately depicted).

How the camera is implemented is not particularly limited. For example, in one specific non-limiting embodiments of the present technology, the camera can be implemented as a mono camera with resolution sufficient to detect objects at pre-determined distances of up to about 30 m (although cameras with other resolutions and ranges are within the scope of the present disclosure).

In some embodiments of the present technology, the camera (or one or more cameras that make up the implementation of the sensor system 230) is configured to capture a pre-determined portion of the surrounding area 260 around the vehicle 220. In some embodiments of the present technology, the camera is configured to capture an image (or a series of images) that represent approximately 90 degrees of the surrounding area 260 around the vehicle 220 that are along a movement path of the vehicle 220.

In other embodiments of the present technology, the camera is configured to capture an image (or a series of images) that represent approximately 180 degrees of the surrounding area 260 around the vehicle 220 that are along a movement path of the vehicle 220. In yet additional embodiments of the present technology, the camera is configured to capture an image (or a series of images) that represent approximately 360 degrees of the surrounding area 260 around the vehicle 220 that are along a movement path of the vehicle 220 (in other words, the entirety of the surrounding area around the vehicle 220).

In a specific non-limiting example, the camera can be of the type available from FLIR Integrated Imaging Solutions Inc., 12051 Riverside Way, Richmond, BC, V6 W 1K7, Canada. It should be expressly understood that the camera can be implemented in any other suitable equipment.

In the non-limiting embodiments of the present technology, the sensor system 230 may further comprise a LIDAR instrument (not separately depicted). Lidar stands for LIght Detection and Ranging. It is expected that a person skilled in the art will understand the functionality of the LIDAR instrument, but briefly speaking, a transmitter (not depicted) of the LIDAR sends out a laser pulse and the light particles (photons) are scattered back to a receiver (not depicted) of the LIDAR instrument. The photons that come back to the receiver are collected with a telescope and counted as a function of time. Using the speed of light ($\sim 3\times 10^8$ m/s), the processor 110 can then calculate how far the photons have travelled (in the round trip). Photons can be scattered back off of many different entities surrounding the vehicle 220, such as other particles (aerosols or molecules) in the atmosphere, other card, stationary objects or potential obstructions in front of the vehicle 220.

In a specific non-limiting example, the LIDAR instrument comprised in the sensor system 230 can be implemented as the LIDAR based sensor that may be of the type available from Velodyne LiDAR, Inc. of 5521 Hellyer Avenue, San Jose, Calif. 95138, United States of America. It should be expressly understood that the LIDAR instrument can be implemented in any other suitable equipment.

In some embodiments of the present technology, the LIDAR instrument comprised in the sensor system 230 can be implemented as a plurality of LIDAR based sensors, such as three, for example, or any other suitable number.

In the non-limiting embodiments of the present technology, the sensor system 230 may further comprise a RAdio Detection And Ranging (RADAR) instrument (not separately depicted). Briefly speaking, the RADAR instrument is a detection instrument using radio waves to determine a range, angle and/or velocity of objects. The RADAR instrument includes a transmitter producing electromagnetic waves, an antenna used for transmitting and receiving electromagnetic waves, a receiver, and a processor to determine properties of the detected objects.

In alternative embodiments of the present technology, there may be a separate antenna for receiving waves, and a separate antenna for transmitting waves. The processor used for determining properties of surrounding objects may be the processor 110.

In some embodiments of the present technology, the RADAR instrument used in the sensor system 230 may comprise long-range, medium-range and short-range RADAR sensors. As a non-limiting example, the long-range RADAR sensor may be used for adaptive cruise control, automatic emergency braking, and forward collision warning, while the medium and short-range RADAR sensors may be used for park assist, cross-traffic alert, junction assist, and blind side detection.

In a specific non-limiting example, the RADAR instrument comprised in the sensor system 230 may be of the type available from Robert Bosch GmbH of Robert-Bosch-Platz 1, 70839 Gerlingen, Germany. It should be expressly understood that the RADAR instrument can be implemented in any other suitable equipment.

In some non-limiting embodiments of the present technology, the sensor system 230 may be used, by the processor 110, for image calibration. For example, using an image captured by the camera and the LIDAR point cloud captured by the LIDAR instrument, the processor 110 is configured to identify a given region of the image to correspond to a given region of the LIDAR point cloud captured by the LIDAR instrument. In other embodiments of the present technology, the sensor system 230 are calibrated such that for the image captured by the camera, the LIDAR point cloud captured by the LIDAR instrument, and the RADAR data captured by the RADAR instrument, the processor 110 is configured to identify a given region of the image to correspond to a given region of the LIDAR point cloud and the RADAR data.

In the non-limiting embodiments of the present technology, the vehicle 220 further comprises or has access to other sensors (not separately depicted). The other sensors include one or more of: an inertial measurement unit (IMU), a Global Navigation Satellite System (GNSS) instrument, ground speed RADARs, ultrasonic SONAR sensors, odometry sensors including accelerometers and gyroscopes, mechanical tilt sensors, magnetic compass, and other sensors allowing operation of the vehicle 220.

As a non-limiting example, the IMU may be fixed to the vehicle 220 and comprise three gyroscopes and three accelerometers for providing data on the rotational motion and linear motion of the vehicle 220, which may be used to calculate motion and position of the vehicle 220.

Communication Network

In some embodiments of the present technology, the communication network 240 is the Internet. In alternative non-limiting embodiments, the communication network 240 can be implemented as any suitable local area network (LAN), wide area network (WAN), a private communication network or the like. It should be expressly understood that implementations of the communication network 240 are for illustration purposes only. How a communication link (not separately numbered) between the electronic device 210 and the communication network 240 is implemented will depend inter alia on how the electronic device 210 is implemented. Merely as an example and not as a limitation, in those non-limiting embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 240 may also use a wireless connection with a server 235.

In some embodiments of the present technology, the communication network 245 may be employed for communicatively coupling electronic devices of other vehicles to the server 235 and/or the electronic device 210. For example, the communication network 245 may be configured to communicatively couple other electronic devices 280 and 290 associated with respective vehicles, similarly to how the electronic device 210 is associated with the vehicle 220.

Server

In some embodiments of the present technology, the server 235 is implemented as a conventional computer server and may comprise some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 235 may be distributed and may be implemented via multiple servers.

In some non-limiting embodiments of the present technology, the processor 110 of the electronic device 210 can be in communication with the server 235 to receive one or more updates. The updates can be, but are not limited to, software updates, map updates, routes updates, weather updates, and the like.

In some embodiments of the present technology, the processor 110 can also be configured to transmit to the server 235 certain operational data, such as routes travelled, traffic data, performance data, and the like. Some or all data transmitted between the vehicle 220 and the server 235 may be encrypted and/or anonymized.

Storage

In FIG. 2, there is also depicted a storage 250 communicatively coupled to the server 235. In some embodiments, however, the storage 250 may be communicatively coupled to the electronic device 210 and/or may be implemented within the electronic device 210 and/or may be communicatively coupled to any other processor of the networked computer environment 200.

In at least some embodiments, it is contemplated that the storage 250 may be used by the server 235, the electronic device 210 and/or any other processor of the networked computer environment 200 as a memory device for storing information. The storage 250 is configured to store information extracted, determined and/or generated by the processor 110 of the server 235 and/or the electronic device 210. Generally speaking, the storage 250 may receive data from the processor 110 which was generated by the processor 110 during processing for temporary and/or permanent storage thereof and may provide stored data to the processor 110 for use thereof. It is contemplated that the storage 250 may be split into several distributed storages, for providing a fault-tolerant storage system for example, without departing from the scope of the present technology.

It should be noted that in at least some embodiments of the present technology, the storage 250 may be implemented locally on the electronic device 210 and/or the server 235 (such as on a local memory, for example). It is also contemplated however that the storage 250 may be implemented remotely from the electronic device 210 and/or the server 235 (such as on a remote memory, for example).

Figure 3:
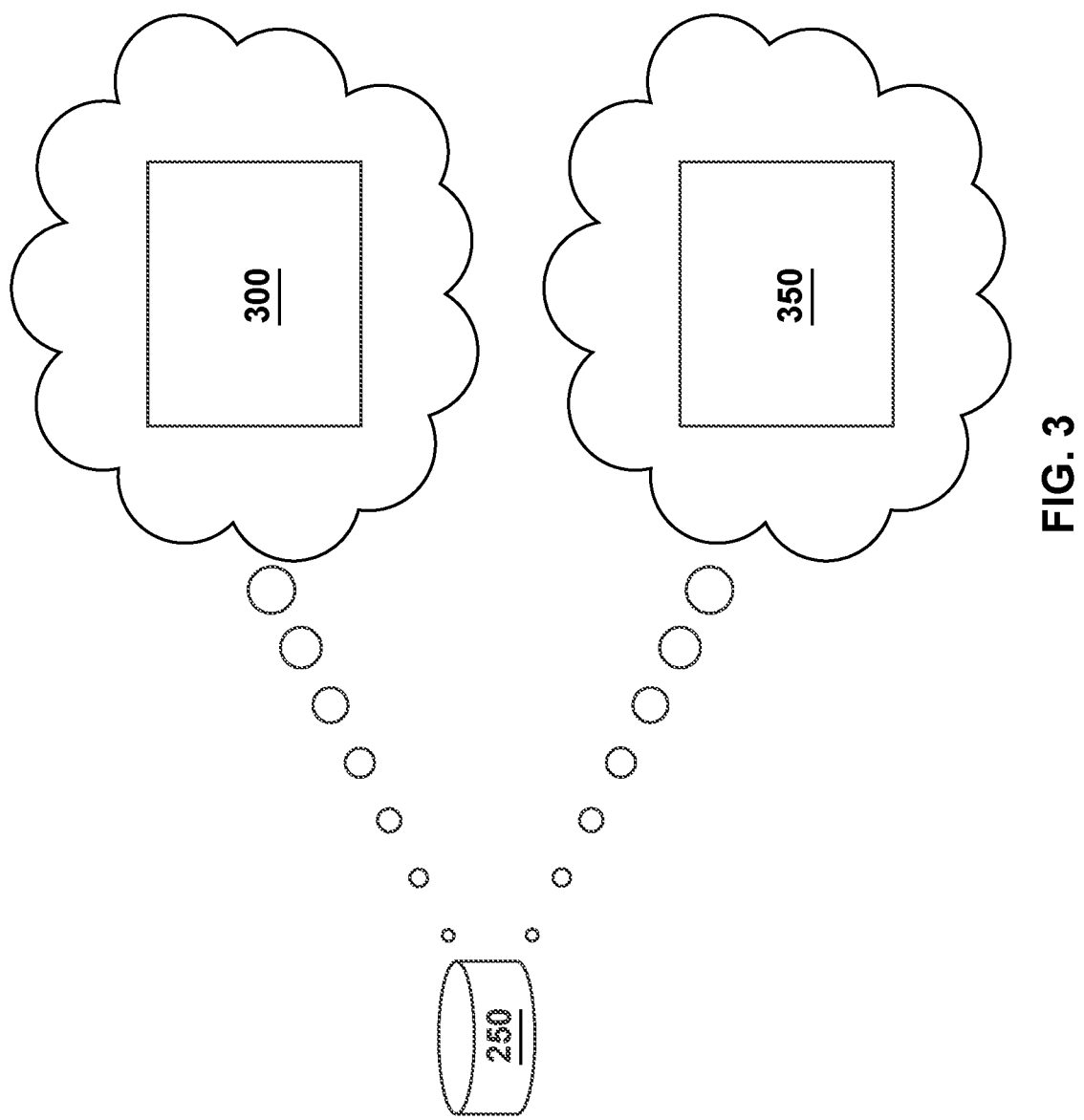
FIG. 3 depicts data stored in the storage of the networked computing environment of FIG. 2, in accordance with at least some embodiments of the present technology.

With reference to FIG. 3, there is depicted the storage 250 storing map data 300 and grid data 350. Broadly speaking, the map data 300 is representative of a 3D map of one or more road segments on which the vehicle 220 and/or other vehicles may be travelling. For example, the vehicle 220, and/or the other vehicles associated with the other electronic devices 280 and 290 may be collecting map data while operating on the one or more road segments. The map data may be collected by a plurality of different sensors, such as sensors of the sensor system 230 for example, and/or via other sensor systems such as, but not limited to, LIDAR systems, RADAR systems, camera-type systems, and the like. The so-collected map data may then be transmitted to the server 235 for merging into the map data 300 that is then stored in the storage 250. The map data 300 includes information about roads, lanes, traffic rules, static and dynamic objects on the roads, and the like.

Generally speaking, the grid data 350 is representative of a "grid structure", or simply a "grid" that may be used by the electronic device 210 with the purpose of discretising a 3D map of a given road segment. In other words, the electronic device 210 may be configured to access the storage 250 and retrieve the grid data 350 and may be configured to use the grid data 350 for overlaying a 3D map of a given road segment with a grid, so that the 3D map of the given road segment can be discretised into a number of cells. As it will become apparent from the description herein further below, the electronic device 210 configured to use the grid data 350 for discretising the 3D map of a given road segment, may allow a more efficient determination of potential collisions between the vehicle 220 and other objects on the given road segment. In some embodiments of the present technology, it is contemplated that the grid data 350 may include information regarding dimensions of the grid, or in other words, size of individual cells of the grid.

How the electronic device 210 may be configured to use the grid data 350 for generating a grid and overlaying it over the 3D map will be described in greater details herein further below.

Electronic Device

In at least some embodiments of the present technology, the electronic device 210 may be employed in order to control operation of the vehicle 220. For example, the electronic device 210 may be configured to generate operation-control data for controlling the vehicle 220 in accordance with one or more trajectories.

Developers of the present technology have realized that the selection of a given trajectory that the vehicle 220 should follow on a given road segment is a technically challenging task. Not only is it complicated to determine candidate trajectories of a given road segment, but it is also computationally challenging to determine which of the candidate trajectories provides a lower risk of collision with other objects on the road segment.

In some embodiments of the present technology, the developers of the present technology have devised methods and devices for determining whether following a given candidate trajectory poses a risk of collision for the vehicle 220. Put another way, methods and devices devised by the developers of the present technology may be employed for determining potential collisions between the vehicle 220 and other objects on the road segment if the vehicle 220 follows a given candidate trajectory on the road segment.

Moreover, developers of the present technology have realized that the process of determining potential collisions between the vehicle 220 and other objects on the road segment should be performed quickly and in an iterative manner. Therefore, it should be noted that the determination of potential collisions should be performed in a computationally efficient manner so as to reduce the amount of time it takes the electronic device 210 to determine whether or not there is a risk of a potential collision between the vehicle 220 and other objects on the road segment.

Broadly speaking, the developers of the present technology have devised methods and devices that enable (i) determining a potential trajectory that the vehicle 220 may follow along the road segment, (ii) identifying collision candidate points along the potential trajectory, and (iii) determining a probability of collision at each collision candidate points. In some embodiments of the present technology, the electronic device 210 may be configured to employ a "grid" structure for accelerating processing of data on the road segment. In other embodiments, the electronic device 210 may be configured to generate and use a computationally-efficient representation of the vehicle 220 for accelerating processing of data on the road segment. In further embodiments, the electronic device 210 may be configured to generate and use a computationally-efficient representation of an object on the road segment for accelerating processing of data on the road segment. How the electronic device 210 is configured to employ the grid, generate and use computationally-efficient representation of the vehicle 220 and of other objects on the road segment will now be described.

Figure 4:
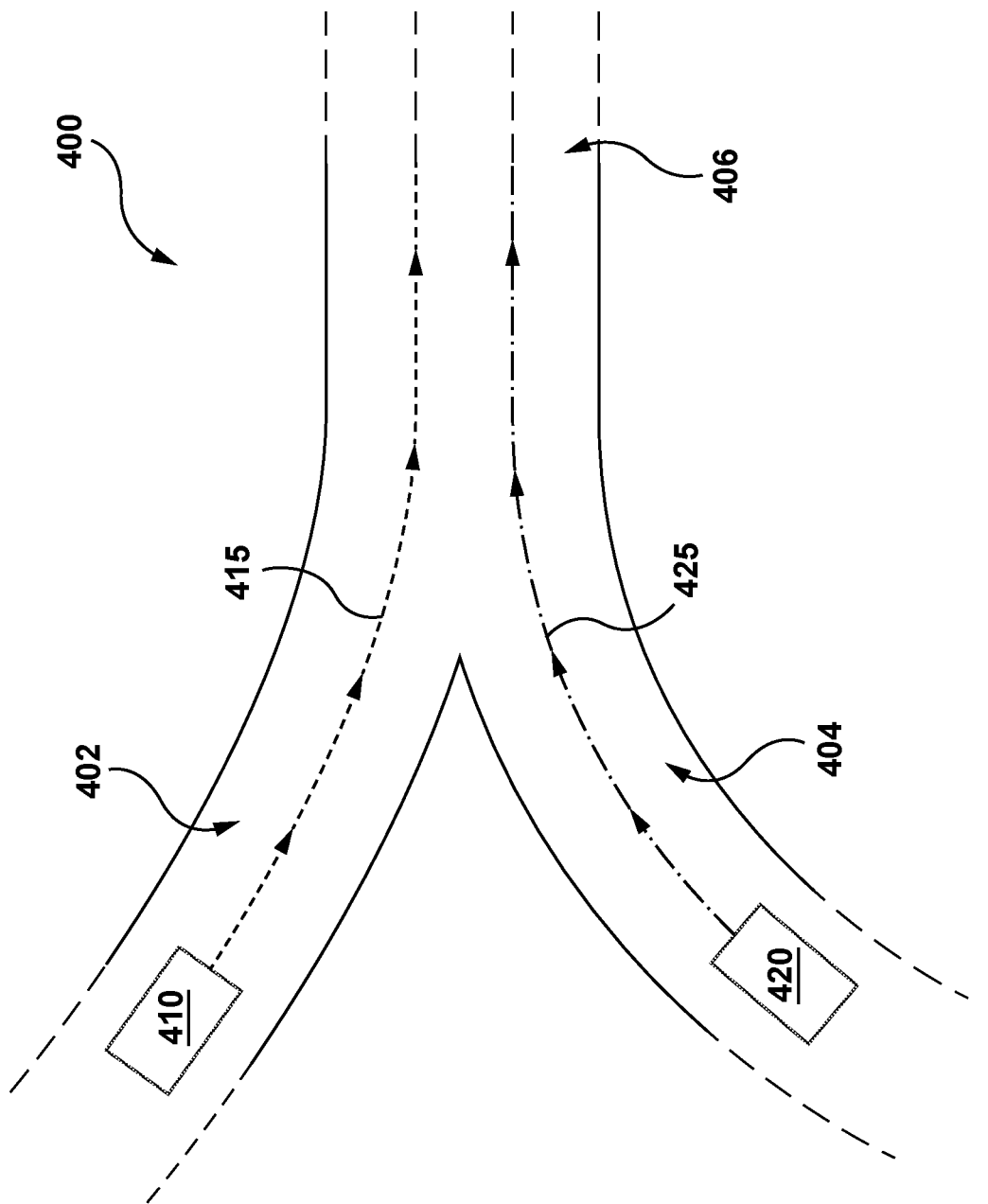
FIG. 4 depicts a map representation of a road segment on which a vehicle of the networked computing environment of FIG. 2 is travelling, in accordance with at least some embodiments of the present technology.

To better illustrate this, reference will now be made to FIG. 4 depicting a map representation of a road segment 400. For example, the electronic device 210 may be configured to access the storage 250 and retrieve map data 300 associated with the road segment 400. As seen, the road segment 400 has a first lane 402 and a second lane 404, which merge into a single lane 406 down the road segment 400.

There is also depicted (i) a representation 410 of the vehicle 220 currently travelling in the first lane 402, and (ii) a representation 420 of a dynamic object, such as a neighbouring vehicle, currently travelling in the second lane 404. It should be noted that the electronic device 210 may be configured to generate the representation 410 by building a "bounding box" such that the bounding box bounds the surface area occupied by the vehicle 220 on the road segment 400. In other words, the size of the representation 410 depends on the size of the vehicle 220. Similarly, the electronic device 210 may be configured to generate the representation 420 by building a "bounding box" such that the bounding box bounds the surface area occupied by the neighbouring vehicle on the road segment 400, and thus, the size of the representation 420 depends on the size of the neighbouring vehicle.

In some embodiments of the present technology, it is contemplated that the electronic device 210 may be configured to generate trajectory data representative of a candidate trajectory 415 for the vehicle 220. For example, the electronic device 210 may use the trajectory data for generating operation-control data for controlling operation of the vehicle 220 on the road segment 400 such that the vehicle 220 follows the candidate trajectory 415 on the road segment 400.

The manner in which the electronic device 210 is configured to generate the candidate trajectory 415 may depend on a specific implementation of the present technology. Nevertheless, it is contemplated that the electronic device 210 may be execute one or more Machine Learning Algorithms (MLAs) in order to determine one or more candidate trajectories for the vehicle 220 for travelling along one or more road segments.

It is also contemplated that the electronic device 210 may be configured to capture movement associated with the neighbouring vehicle, such as via the sensor system 230, for example, and, based on the so-captured movement data, may be configured to generate an estimated trajectory 425 for the neighbouring vehicle on the road segment 400. It should be noted that the estimated trajectory 425 is indicative of a trajectory that the neighbouring vehicle is estimated to follow along the road segment 400 in view of his current movement and behaviour on the road segment 400.

The manner in which the electronic device 210 is configured to generate the estimated trajectory 425 may depend on a specific implementation of the present technology. Nevertheless, it is contemplated that the electronic device 210 may be instrumental in determine one or more estimated trajectories for the one or more neighbouring vehicles that the one or more neighbouring may follow on one or more road segments. The electronic device 210 can use the same or differently trained MLA for predicting trajectories of other vehicles.

It is contemplated that, in at least some embodiments of the present technology, the electronic device 210 may be configured to determine whether or not the vehicle 220 following the candidate trajectory 415 has a risk of collision with the neighbouring vehicle following the estimated trajectory 425.

Figure 5:
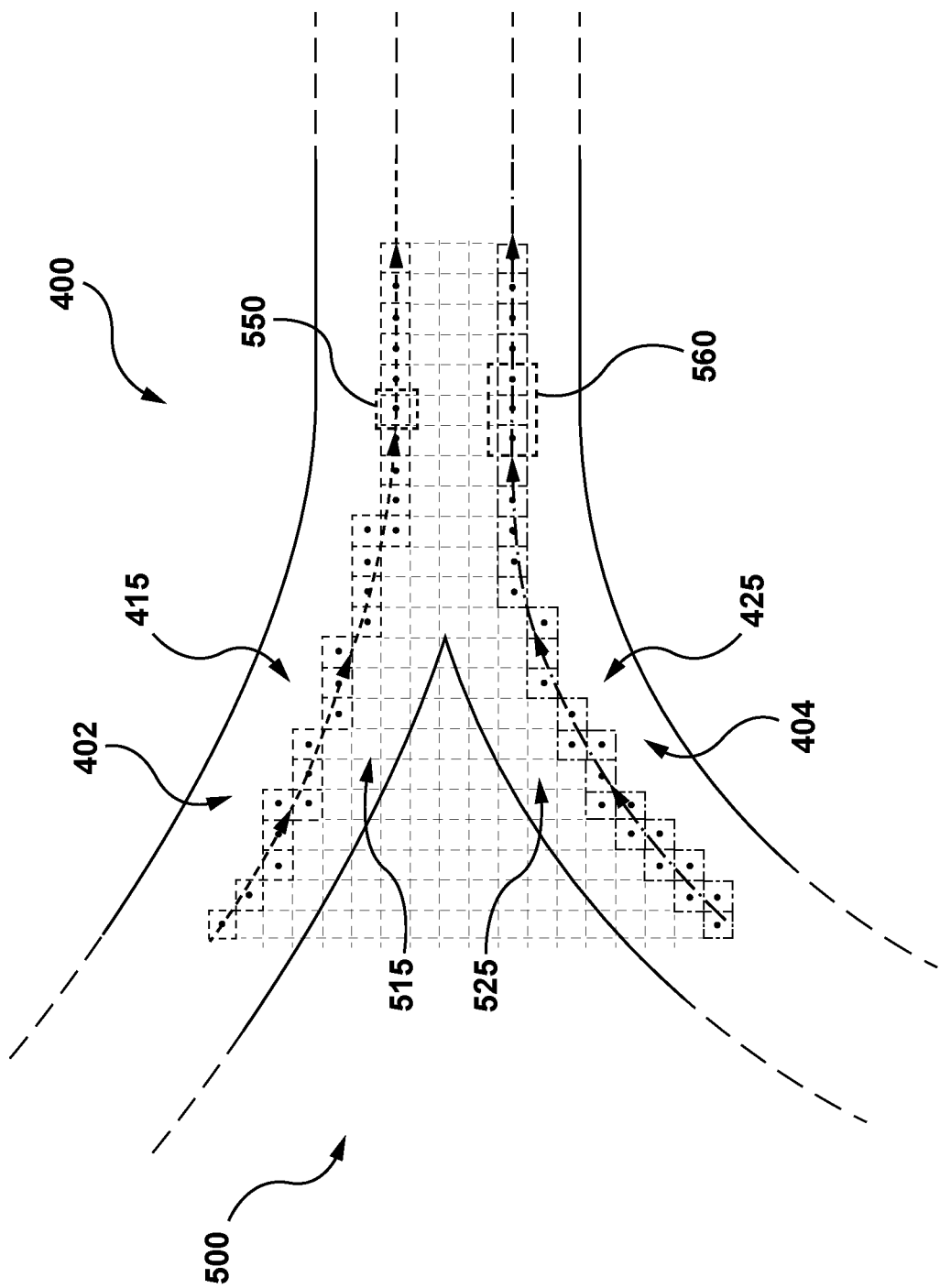
FIG. 5 depicts a grid overlaid on the map representation of FIG. 4, in accordance with at least some embodiments of the present technology.

To that end, the electronic device 210 may be configured to access the storage 250 and retrieve grid data 350. With reference to FIG. 5, the electronic device 210 may be configured to use the grid data 350 for generating a grid 500 and overlaying the grid 500 on the map representation of the road segment 400. It should be noted that the electronic device 210 may be configured to generate the grid 500 based on the grid data 350 as a spatially hashed grid. In some embodiments, it is contemplated that the size of individual cells of the grid 500 may be pre-selected. It should be noted that the size of the individual cells may be pre-selected in view of a trade-off between the processing time and accuracy of collision detection. For example, the smaller the individual cells, the more individual cells the grid 500 will encompass, the more processing time will be required for the electronic device 210 to process information in each of the individual cells of the grid 500.

In other embodiments, the electronic device 210 may be configured to use an R-tree, instead of the grid 500 for discretising the map representation of the road segment 400. Broadly speaking, R-trees are tree data structures used for indexing multi-dimension information such as geographical coordinates, for example. As such, it is contemplated that the electronic device 210 may be configured to generate a R-tree structure for discretising the spatial coordinates on the map representation of the road segment 400.

Irrespective of a specific manner in which the electronic device 210 generates the grid 500 and overlays the grid 500 on the map representation of the road segment 400. It can be said that the electronic device 210 may be configured to spatially discretise the road segment 400, such that each cell of the grid 500 corresponds to a respective section of the road segment 400.

In some embodiments of the present technology, the electronic device 210 may be configured to determine a plurality of trajectory points for the candidate trajectory 415 based on the grid 500. In other words, the electronic device 210 may be configured to determine a plurality of cells 515 of the grid 500 that encompass at least partially the candidate trajectory 415 when the grid 500 is overlaid on the map representation of the road segment 400.

It is also contemplated that the electronic device 210 may be configured to determine a plurality of trajectory points for the estimated trajectory 425 based on the grid 500. In other words, the electronic device 210 may be configured to determine a plurality of cells 525 of the grid 500 that encompass at least partially the estimated trajectory 425 when the grid 500 is overlaid on the map representation of the road segment 400.

In some embodiments of the present technology, the electronic device 210 may be configured to analyse at least some of the plurality of trajectory points of the candidate trajectory 415 (e.g., at least some of the plurality of cells 515) for determining whether there is a risk of collision between the vehicle 220 and the neighbouring vehicle when the vehicle 220 is located at the respective trajectory point. How the electronic device 210 is configured to perform such analysis will now be described.

To better illustrate this, let's take the example of a given one of the plurality of trajectory points corresponding to the respective cell 550 of the plurality of cells 515. For this given one of the plurality of trajectory points, the electronic device 210 may be configured to (i) determine a presence of one or more dynamic objects around the vehicle 220 at the given one of the plurality of trajectory points, and (ii) apply a first algorithm to determine a set of collision candidates.

For example, the electronic device 210 may determine presence of at least some cells from the plurality of cells 525 in proximity to the given one of the plurality of trajectory points corresponding to the respective cell 550. The electronic device 210 may then be configured to apply the first algorithm for determining a set of collision candidates for the vehicle 220 when the vehicle 220 is located at the cell 550. For example, the electronic device 210 may be configured to use the grid 500 for determining the closest cells from the plurality of cells 525 to the cell 550 such as, for example, a set of cells 560.

It should be noted that the set of collision candidates corresponding to the neighbouring vehicle being located at the respective ones of the set of cells 560 may represent (i) the neighbouring vehicle as being a first dynamic object potentially causing collision with the vehicle 220 when the vehicle 220 is at the cell 550 and when the neighbouring vehicle is at a first one of the set of cells 560, (i) the neighbouring vehicle as being a second dynamic object potentially causing collision with the vehicle 220 when the vehicle 220 is at the cell 550 and when the neighbouring vehicle is at a second one of the set of cells 560, and (iii) the neighbouring vehicle as being a third dynamic object potentially causing collision with the vehicle 220 when the vehicle 220 is at the cell 550 and when the neighbouring vehicle is at a third one of the set of cells 560.

In some embodiments, it is contemplated that determining the closest cells to the cell 550 which are associated with estimated trajectories of one or more neighbouring vehicle may allow filtering out/excluding at least some of the neighbouring vehicles from collision detection analysis. For example, if a given neighbouring vehicle is associated with a given estimated trajectory and that the cells of the grid 500 corresponding to this estimated trajectory are outside a pre-determined threshold number of cells away from the cell 550, the given neighbouring vehicle will be excluded from collision detection analysis. It is contemplated that filtering out/excluding at least some objects in such a manner from the collision detection analysis may reduce the processing time required for performing the collision analysis for the vehicle 220.

It should be noted that once the electronic device 210 determines the set of collision candidates corresponding to the respective ones of the set of cells 560, the electronic device 210 may be configured to generate (i) a computationally-efficient representation of the vehicle 220, and (ii) computationally-efficient representations of each of the set of collision candidates. How the electronic device 210 is configured to generate the computationally-efficient representations of the vehicle 220 and of each of the set of collision candidates will now be discussed in turn.

Figure 6:
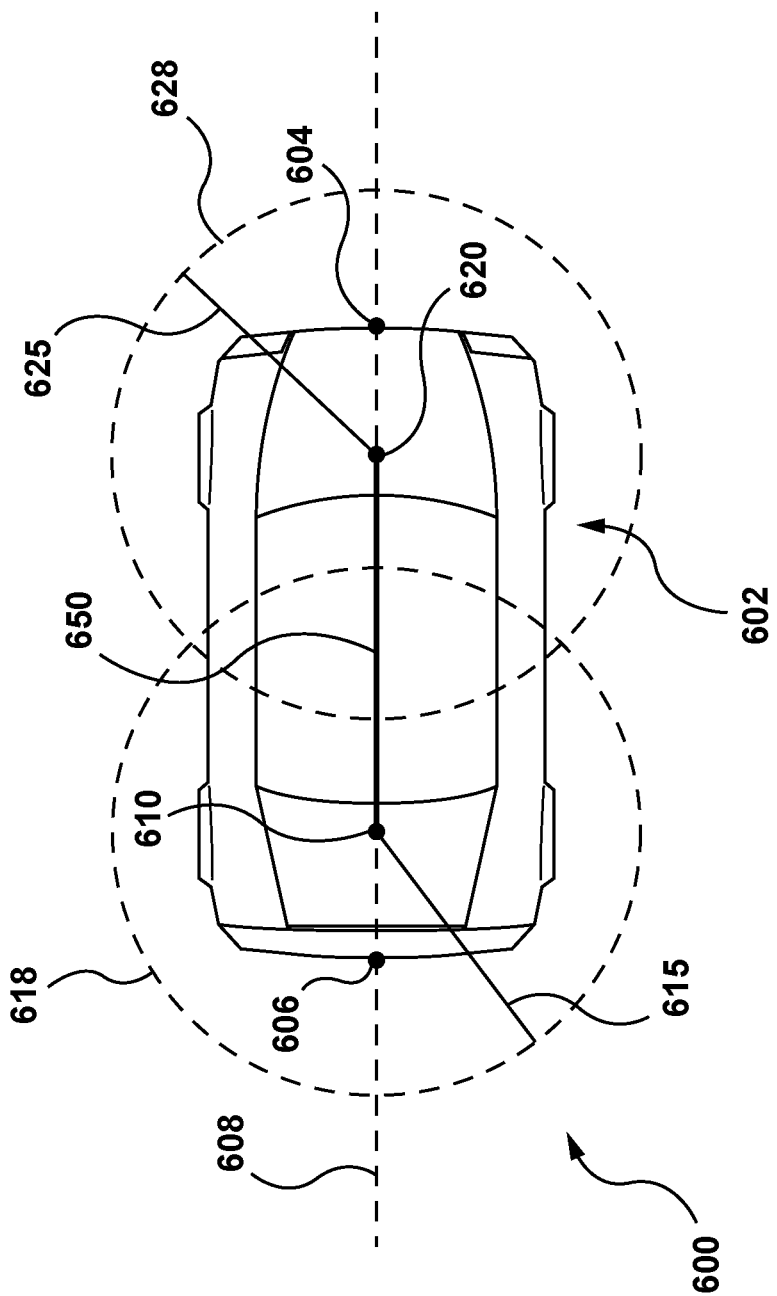
FIG. 6 depicts a generation process of a computationally-efficient representation of the vehicle of the networked computing environment of FIG. 2, in accordance with at least some embodiments of the present technology.

With reference to FIG. 6, there is depicted a generation process 600 executed by the electronic device 210 for generating the computationally-efficient representation of the vehicle 220. In FIG. 6, there is depicted a body image 602 of the vehicle 220, as seen from the birds eye view. In one embodiment, size of the body image 602 may be pre-stored in the storage 250 and/or may be generated by the electronic device 210 using the sensor system 230 of the vehicle 220.

The generation process 600 begins with the electronic device 210 selecting/generating a front point 604 that is a mid-point along a front bumper of the vehicle 220 (as seen, the front point 604 is positioned midway on the front bumper of the body image 602). The generation process 600 continues with the electronic device 210 selecting/generating a back point 606 that is the mid-point of a back bumper of the vehicle 220 (as seen, the back point 606 is positioned midway on the back bumper of the body image 602). It should be noted that in implementations where the vehicle 220 has portions thereof that extend more forward than the front bumper, the electronic device 210 may be configured to generating the front point 604 that corresponds to mid-point of a most forwardly-extending body part of the vehicle 220. Similarly, in implementations where the vehicle 220 has portions thereof that extend more rearward than the back bumper, the electronic device 210 may be configured to generating the back point 606 that corresponds to mid-point of a most rearwardly-extending body part of the vehicle 220.

The generation process 600 continues with the electronic device 210 drawing/generating a line 608 that passed through the front point 604 and the back point 606. In some implementations of the present technology, where the vehicle 220 is symmetrical, the line 608 may correspond to a longitudinal axis of the vehicle 220. In such cases, the line 608 may divide the body image 602 into two symmetrical portions of the body image 602.

The generation process 600 continues with the electronic device 210 selecting/generating two cut off points along the line 608, namely a front cut off point 620 and a back cut off point 610. The front cut off point 620 and the back cut off point 610 define along the line 608 a segment line 650. It should be noted that the electronic device 210 may be configured to select/generate the front cut off point 620 and the back cut off point 610 such that (i) a front circle 628 centered at the front cut off point 610 with a radius 625 and (ii) a back circle 618 centered at the back cut off point 610 with a radius 615 encompass each point of the vehicle 220.

In some embodiments of the present technology, the radius 615 and the radius 625 may be pre-determined. In one example, the radius 615 and the radius 625 may correspond to a half of the width of the vehicle 220 such as, for example, half the width between the sides of the body image 602.

As it will become apparent from the description herein further below, the electronic device 210 may be configured to employ the segment line 650 as the computationally-efficient representation of the vehicle 220 during potential collision analysis, instead of the representation 410 of the vehicle 220 which is a bounding box bounding the surface area occupied by the vehicle 220.

Figure 7:
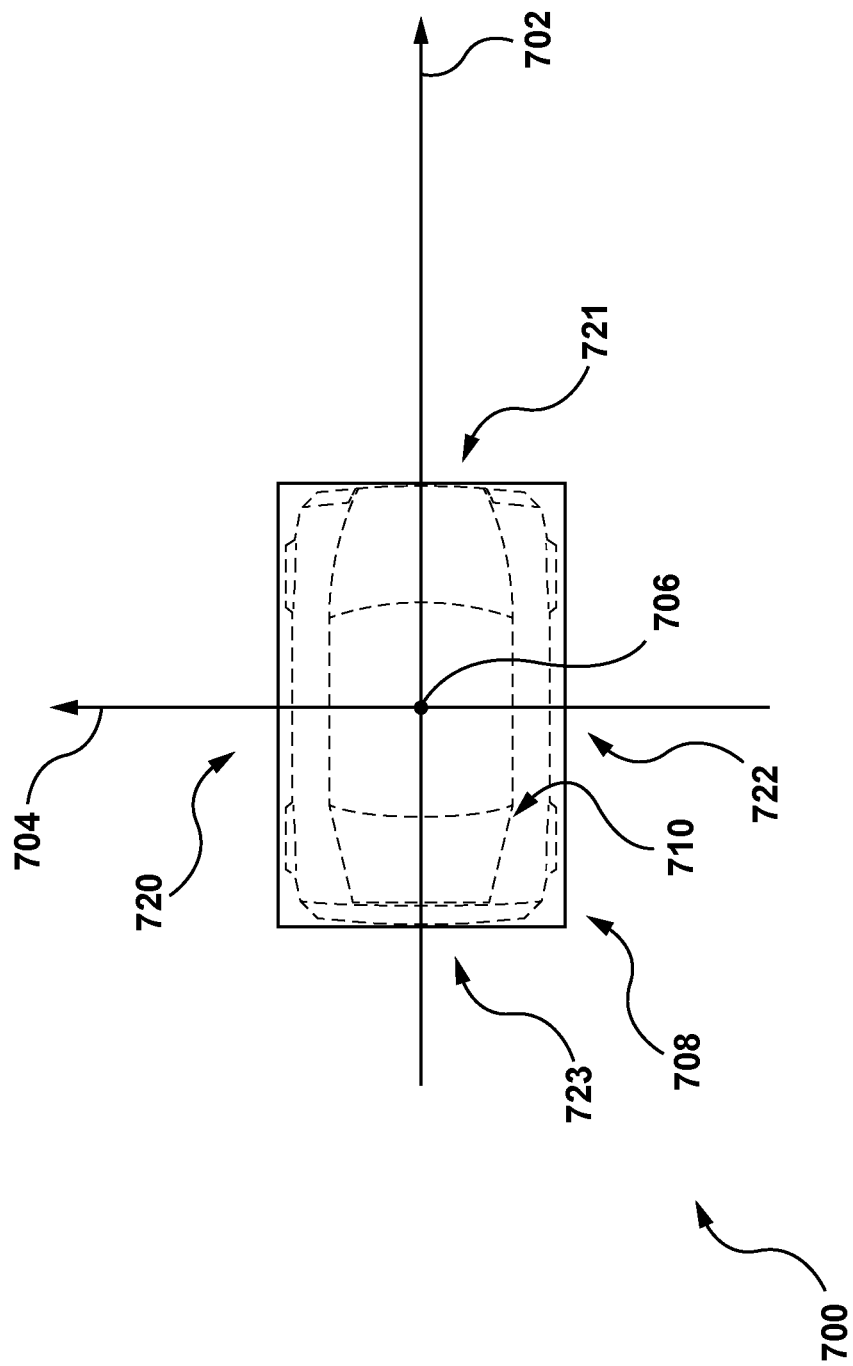
FIG. 7 depicts a generation process of a computationally-efficient representation of the an other vehicle on the road segment of FIG. 4, in accordance with at least some embodiments of the present technology.

With reference to FIG. 7, there is depicted a generation process 700 executed by the electronic device 210 for generating the computationally-efficient representation of the neighbouring vehicle. In FIG. 7, there is depicted a body image 710 of the neighbouring vehicle. In one embodiment, the body image 710 may be generated by the electronic device 210 using the sensor system 230 of the vehicle 220.

The generation process 700 begins with the electronic device 210 generating a bounding box 708 for the neighboring vehicle. As seen, the bounding box 708 has four boundaries, namely a back boundary 723, a front boundary 721, a left boundary 720, and right boundary 722. The electronic device 210 is configured to generate the boundaries of the bounding box 708 such that the totality of the body image 710 of the neighboring vehicle is encompassed within the boundaries of the bounding box 708.

The generation process 700 continues with the electronic device 210 determining a system of coordinates 750 for the bounding box 708. For example, the electronic device 210 may be configured to define a longitudinal axis 704 of the system of coordinates 750 such that the longitudinal axis 704 passes through a longitudinal midpoint at sides of the bounding box 708. In the same example, the electronic device 210 may be configured to define a transverse axis 702 of the system of coordinates 750 such that the transverse axis 702 passes through a transverse midpoint at a front and a back of the bounding box 708.

As a result, the electronic device 210 may be configured to generate the system of coordinates 750 having a zero point 706 at a crossing if the longitudinal axis 704 and of the transverse axis 702.

Alternatively, the electronic device 210 may be configured to generate the longitudinal axis 704 and the transverse axis 702 for generating the system of coordinates 750 and then may be configured to align the origin thereof (the zero point 706) with a centre point (not numbered) of the bounding box 708, without departing from the scope of the present technology.

In some embodiments of the present technology, the electronic device 210 may be configured to generate a bounding box around each of the set of collision candidates—that is, in this case, generate a first bounding box around the neighbouring vehicle as if located along the estimated trajectory 25 at the first one of the set of cells 560, generate a second bounding box around the neighbouring vehicle as if located along the estimated trajectory 425 at the second one of the set of cells 560, generate a third bounding box around the neighbouring vehicle as if located along the estimated trajectory 425 at the third one of the set of cells 560.

It is contemplated that the electronic device 210 may be configured to generate the first bounding box, the second bounding box, and the third bounding box similarly to how the electronic device 210 generates the bounding box 708 for the neighbouring vehicle.

In some embodiments of the present technology, the electronic device 210 may be configured to, for the given one of the set of collision candidates, perform a distance analysis between the segment line 650 of the vehicle 220 and the respective bounding box of the given one of the set of collision candidates. The distance analysis may be used by the electronic device 210 for determining a separation distance between the vehicle 220 and the given one of the set of collision candidates.

Figure 8:
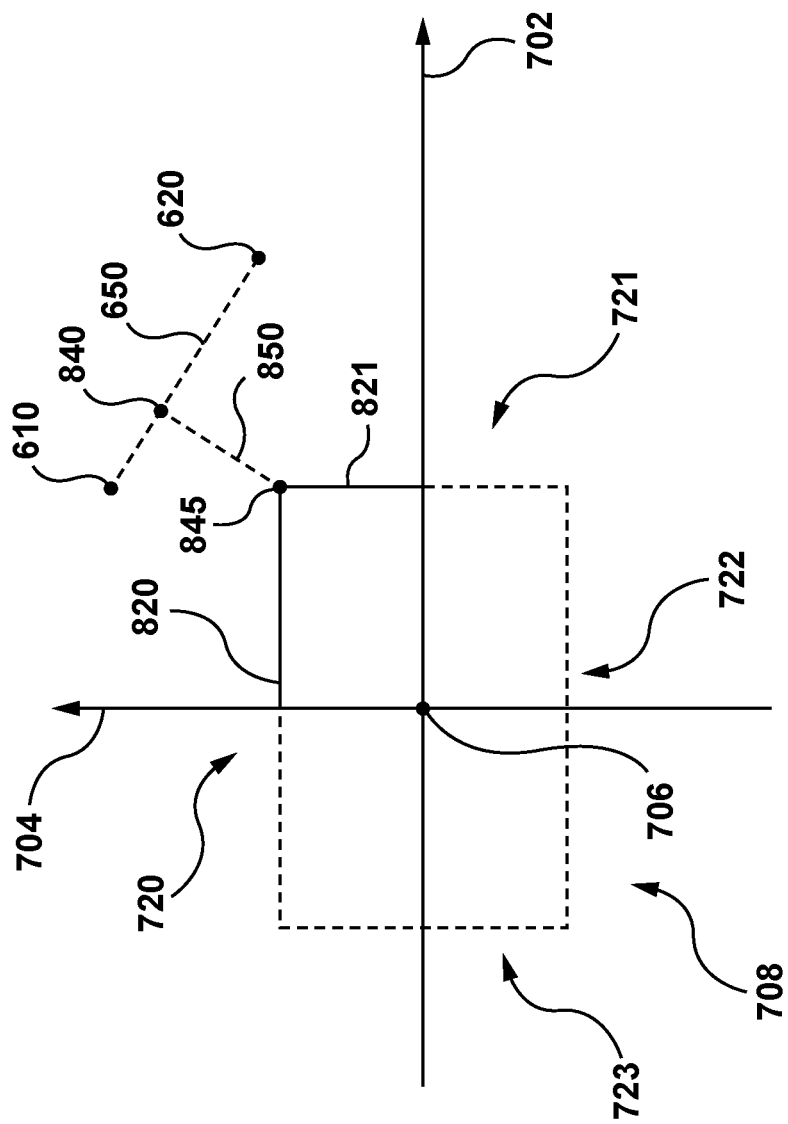
FIG. 8 depicts a distance analysis process between the computationally-efficient representations of the vehicle and of the other vehicle, in accordance with at least some embodiments of the present technology.
Figure 9:
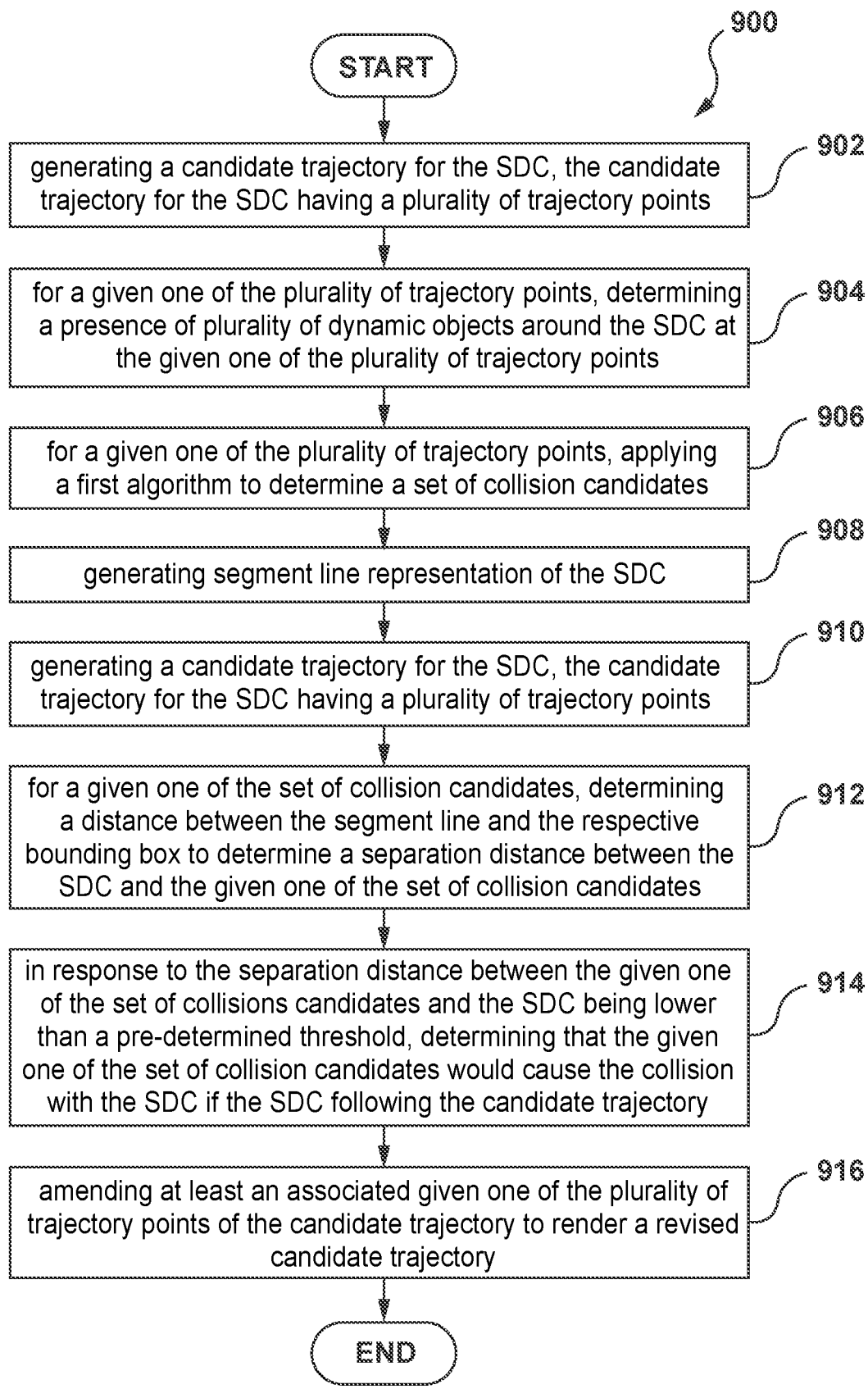
FIG. 9 depicts a flow chart of a method, the method executable by a computer device, in accordance with the non-limiting embodiments of the present technology.

With reference to FIG. 8, there is depicted a distance analysis 800 that the electronic device 210 may be configured to perform for the first collision candidate amongst the set of collision candidates (e.g., for the neighbouring vehicle as if the neighbouring vehicle is located along the estimated trajectory 425 at the first one of the set of cells 560) will now be discussed with reference to FIG. 8.

The electronic device 210 may be configured to map the segment line 650 and the bounding box 708 based on relative positions of the cell 550 and the first one of the set of cells 560 in the grid 500. As seen, there is depicted the system of coordinates 750 cantered at the bounding box 708 and the segment line 650 positioned at its relative distance from the bounding box 708. It can also be said that the electronic device 210 may be configured to project the segment line 650 in the system of coordinates 750 such that the projected position of the segment line 650 in the system of coordinates 750 corresponds to the position of the segment line 650 relative to the bounding box 708 as if the neighbouring vehicle is located at the first one of the subset of cells 560 and the vehicle 220 is located at the cell 550.

In some embodiments of the present technology, during the distance analysis 800 the electronic device 210 may be configured to determine a subset of sides of the bounding box 708 that are to be compared against the segment line 650. Developers of the present technology have realized that determining distances between the segment line 650 and each one of the boundaries of the bounding box 708 is redundant and result in a larger number of operations that the electronic device 210 needs to perform for determining a shortest distance between the segment line 650 and the bounding box 708.

As a result, by performing a pre-selection of sides of the bounding box 708, thereby determining the subset of sides of the bounding box 708 for the purpose of comparison against the segment line 650, the electronic device 210 may be configured to reduce the number of operations that the electronic device 210 needs to perform for determining the shortest distance between the segment line 650 and the bounding box 708 and, hence, render this distance analysis 800 quicker and more efficient.

The electronic device 210 may be configured to perform the pre-selection of sides of the bounding box 708 based on a variety of heuristics. It should be noted that the electronic device 210 may be configured to project the segment line 650 on the system of coordinates 750 such that at least one of the cut off points 620 and 610 are located within the first quadrant of the system of coordinates 750.

Figure 10:
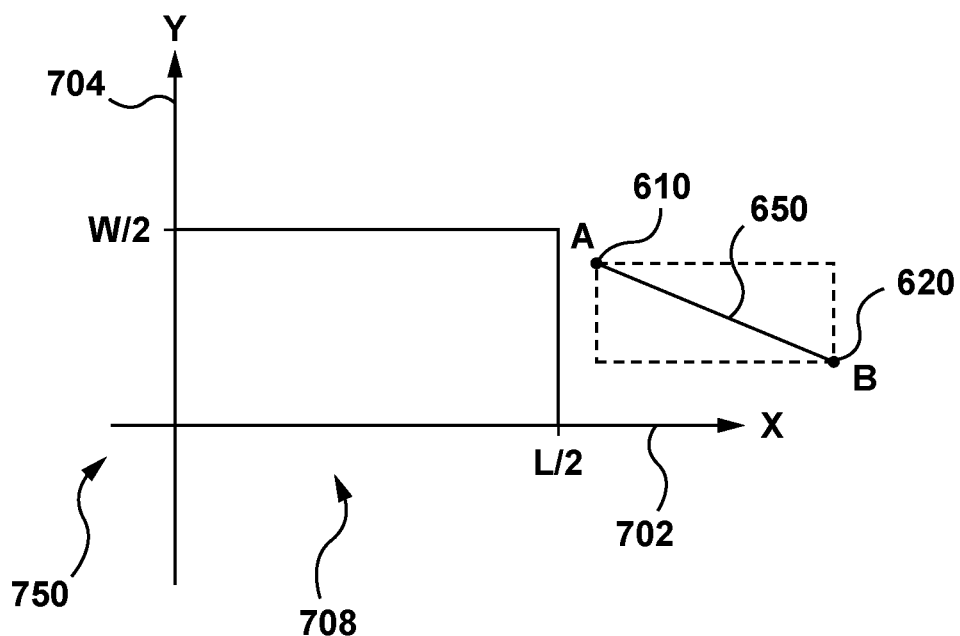
FIG. 10 depicts a first scenario of a comparison of the computationally-efficient representation of the vehicle of FIG. 6 against the computationally-efficient representation of the an other vehicle of FIG. 7.
Figure 11:
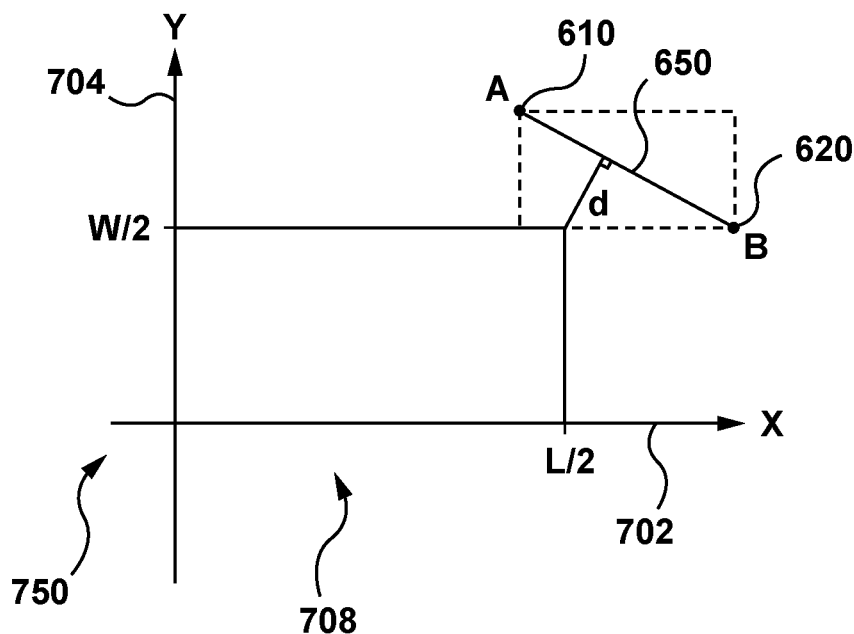
FIG. 11 depicts a second scenario of a comparison of the computationally-efficient representation of the vehicle of FIG. 6 against the computationally-efficient representation of the an other vehicle of FIG. 7.

If any one of the two cut off points 620 and 610 are within the bounding box 708, the electronic device 210 may be configured to determine that there is collision, and the verification ends. If none of the two cut off points 620 and 610 are within the bounding box 708, such as depicted in FIGS. 10 and 11, the electronic device 210 may be configured to perform additional procedures directed at further optimizing the calculation.

The verification of whether the two cut off points 620 and 610 are within the bounding box 708 can be executed by drawing an additional bounding box around the segment line 650, such that one side of the additional bounding box is parallel to X axis (e.g., transverse axis 702) and the other one parallel to Y axis (e.g., the longitudinal axis 704) of the system of coordinates 750.

In the example below, one of the front cut off point 620 and the back cut off point 610 is referred to as A and the other one of the front cut off point 620 and the back cut off point 610 is referred to as B (see FIGS. 10 and 11).

During a first step of the verification process, the electronic device 210 may define a band on the vertical axis of the system of coordinates 750 having a width of −W/2 to W/2 (the W being representative of the width of the neighboring vehicle and/or the width of the bounding box 708), this is also referred to as a horizontal corridor. In response to B being entirely in the band between −W/2 and W/2 (but not within the bounding box 708), the distance between the neighbouring vehicle and the vehicle 220 can be determined as a distance from the point to the right edge of the bounding box 708, that is, the coordinate of the leftmost point of the segment minus L/2 (the L being the length of the neighbouring vehicle and/or the length of the bounding box 708). This scenario can be seen in FIG. 10.

During a second step of the verification, the electronic device 210 repeats the same steps as in the first step, but using the horizontal axis of the system of coordinates 750 and a band −L/2 and L/2. This is referred to as a vertical corridor.

During a third step of the verification, in response to the segment A-B not intersecting with the bounding box 708, but at the same time not falling into any band entirely (either based on W or L), then the distance between neighbouring vehicle and the vehicle 220 is the distance 850 from the segment line 650 to one of the corners of the bounding box 708. This scenario can be seen in FIG. 11.

It should be noted that, the electronic device 210 may determine which corner of the bounding box 708 to analyze by looking in which quadrant of the system of coordinates 750 is the point B located using a pseudocode below.

Pseudocode

If (B·x<−L/2 and A·y>b·y), then distance between the neighbouring vehicle and the vehicle 220 is a distance from AB to the point (−L/2, W/2);

If (B·y<−W/2 and A·x>B·x), then distance between the neighbouring vehicle and the vehicle 220 is a distance from AB to the point (L/2, −W/2); and Otherwise, the distance between the neighbouring vehicle and the vehicle 220 is a distance is the distance from AB to the point (L/2, W/2).

During a fourth step of the verification, in response to the segment line 650 intersecting with the X axis of the system of coordinates 750, if the intersection point of the segment line 650 with the X axis is within the bounding box 708, then it is indicative of a likelihood of a collision.

During a fifth step of the verification, if none of the above steps renders a positive outcome (e.g. likelihood of collision), the fifth step is to determine a closest distance between the segment line 650 and three corners of the bounding box 708:

the distance between the segment line 650 and the point (W/2, H/2); or the distance between the segment line 650 and the point (W/2, −H/2); or the distance between the segment line 650 and the point (−W/2, H/2).

In some embodiments, it is contemplated that the electronic device 210 may be configured to identify a first segment 820 and a second segment 821 of the bounding box 708 as being the subset of segments that the electronic device 210 needs to compare against the segment line 650. It should be noted that the first segment 820 is a front portion of the left boundary 720 of the bounding box 708, and that the second segment 821 is a left portion of the front boundary 721 of the bounding box 708.

The electronic device 210 may then be configured to compare the segment line 650 against the first segment 820 and the second segment 821 for determining the shortest distance between the segment line 650 and the bounding box 708. As illustrated, the electronic device 210 may be configured to determine a distance 850 being the shortest distance between the segment line 650 (e.g., a point 840 along the segment line 650) and the bounding box 708 (e.g., a point 845 of the bounding box 708 corresponding to the intersection of the first segment 820 and of the second segment 821).

In some embodiments of the present technology, the electronic device 210 may be configured to determine, based on the distance 850, whether the given one of the set of collision candidates would cause a collision with the vehicle 220 if the vehicle 220 is following the candidate trajectory 415. For example, the electronic device 210 may be configured to compare the distance 850 against the pre-determined lengths of the first radius 625 and of the second radius 615 that have been used during the generation process 600 of the segment line 650. For example, the electronic device 210 may be configured to compare the distance 850 against a distance equivalent to half of the width of the vehicle 220.

To better illustrate this, let it be assumed that the distance 850 is larger than the pre-determined length used during the generation process 600 for determining the first and second cut off points 620 and 610 of the segment line 650. Then, it can be said that there will not be any collision between the vehicle 220 located at the cell 550 and the neighbouring vehicle located at the first one of the set of cells 560.

Now, let it be assumed that the distance 850 is smaller than the pre-determined length used during the generation process 600 for determining the first and second cut off points 620 and 610 of the segment line 650. Then, it can be said that it is likely that a collision occurs between the vehicle 220 located at the cell 550 and the neighbouring vehicle located at the first one of the set of cells 560.

In this second example, the electronic device 210 may be configured to amend at least one trajectory point of the candidate trajectory 415 so as to render a revised candidate trajectory where no collision occurs with the neighbouring vehicle being located at the first one of the set of cells 560.

The electronic device 210 may be configured to perform a given distance analysis for each one of the set of cells 560, similarly to how the electronic device 210 is configured to perform the distance analysis 800 for the first one of the set of cells 560.

In some embodiments of the present technology, there is provided a method 900 of generating a trajectory for a SDC, such as the vehicle 220 for example. Various steps of the method 900 will now be described.

Step 902: Generating a Candidate Trajectory for the SDC, the Candidate Trajectory for the SDC Having a Plurality of Trajectory Points The method 900 begins at step 902 with the electronic device 210 configured to generate a given candidate trajectory for the vehicle 220, such as the candidate trajectory 415 for the vehicle 220 on the road segment 400. It should be noted that the given trajectory may have a plurality of trajectory points.

Step 904: For a Given One of the Plurality of Trajectory Points, Determining a Presence of Plurality of Dynamic Objects Around the SDC at the Given One of the Plurality of Trajectory Points The method 900 continues to step 904 with the electronic device 210 configured to, for a given one of the plurality of trajectory points, determine a presence of plurality of dynamic objects around the vehicle 220 at the given one of the plurality of trajectory points.

For example, for the given one of the plurality of trajectory points, such as a trajectory point corresponding to the cell 550 in FIG. 5, the electronic device 210 may be configured to determine presence of one or more dynamic objects around the vehicle 220, such as the neighbouring vehicle associated with the estimated trajectory 425, and/or one or more other dynamic objects around the vehicle 220.

Step 906: For a Given One of the Plurality of Trajectory Points, Applying a First Algorithm to Determine a Set of Collision Candidates The method 900 continues to step 906 with the electronic device 210 configured to, for the given one of the plurality of trajectory points, apply a first algorithm to determine a given set of collision candidates. It is contemplated that the set of collision candidates may be a subset of the plurality of dynamic objects.

It should be noted that the set of collision candidates may be potentially causing a collision with the vehicle 220 when the vehicle 220 is at the given one of the plurality of trajectory points (e.g., corresponding to the cell 550). In this case, the set of collision candidates may include the neighbouring vehicle associated with the trajectory 425 being at the respective cells of the set of cells 560.

In some embodiments, as part of the first algorithm, the electronic device 210 may be configured to apply the grid 500 having cells of a pre-determined size. In some embodiments, the electronic device 210 may be configured to determine the set of collision candidates by determining collision candidates that are located within a pre-determined number of cells away from the cell 550 associated with the vehicle 220.

It is contemplated that in some embodiments of the present technology, the set of collision candidates may be smaller than the plurality of dynamic objects around the vehicle 220 on a given road segment. For example, one or more potential objects having estimated trajectories that correspond to cells of a given grid that are more than pre-determined number of cells away from the cell 550 associated with the vehicle 220, may be excluded from the collision detection analysis, and hence, may reduce the processing time required for the electronic device 210 to perform the collision detection analysis.

In other embodiments, the electronic device 210 may be configured to pre-determining the pre-determined size of the cells of the grid 500. It is also contemplated selecting the pre-determined size by the electronic device 210 may comprise the electronic device 210 pre-determining the pre-determined size while taking into account a trade-off between processing time and accuracy of the collision detection analysis—that is, during pre-determination of the pre-determined size, the electronic device 210 may be configured to determine the per-determined size by balancing a processing speed and a number of potential false positives rendered by the collision detection analysis.

Step 908: Generating Segment Line Representation of the SDC

The method 900 continues to step 908 with the electronic device 210 generating the segment line 650 for the vehicle 220. For example, with reference to FIG. 6, the electronic device may be configured to perform the generation process 600.

It is contemplated that the step 908 may comprise the electronic device 210 configured to selecting the front point 604, select the back point 606, draw the line 608, and selecting the two cut off points 620 and 610 along the line 608 to define the segment line 650, as described above.

Step 910: Generating a Respective Bounding Box Around Each of the Set of Collision Candidates The method 900 continues to step 910 with the electronic device 210 configured to generate a respective bounding box around each of the set of collision candidates. For example, the electronic device 210 may be configured to perform the generation process 700 for the neighboring vehicle being located at each respective one of the set of cells 560.

Step 912: For a Given One of the Set of Collision Candidates, Determining a Distance Between the Segment Line and the Respective Bounding Box to Determine a Separation Distance Between the SDC and the Given One of the Set of Collision Candidates The method 900 continues to step 912 with the electronic device 210 being configured to, for a given one of the set of collision candidates, determine a given distance between the segment line 650 and the respective bounding box to determine a separation distance between the vehicle 220 and the given one of the set of collision candidates.

For example, the electronic device 210 may be configured to, for a first one of the set of collision candidates corresponding to the neighbouring vehicle being located at the first one of the set of cells 560, perform the distance analysis 800 depicted in FIG. 8. This means that the electronic device 210 may be configured to determine the distance 850.

In some embodiments, the step 912 comprises the electronic device 210 being configured to apply a second algorithm to determine a subset of sides of the respective bounding box that is to be analysed. For example, the electronic device 210 may be configured to apply the second algorithm to determine the first segment 820 and the second segment 821 of the bounding box 708. It should be noted that the distance 850 may be based on only the first segment 820, the second segment 821 of the bounding box 708 and the segment line 650.

In some embodiments of the present technology, the electronic device 210 applying the second algorithm may be configured to, for the bounding box 708, determine a coordinate system 750 by defining (i) the longitudinal axis 704 through a longitudinal midpoint at sides of the bounding box 708 and (ii) the transverse axis 702 through a transverse midpoint at a front and a back of the bounding box 708. The coordinate system 750 has the zero point 706 (e.g., the origin thereof) at a crossing of the longitudinal axis 704 and the transverse axis 702.

In some embodiments, the electronic device 210 applying the second algorithm may be configured to project the segment line 650 on the longitudinal axis 704 and the transverse axis 702 to define a projected position of the segment line 650 in the coordinate system 750, as depicted in FIG. 8.

In some embodiments, the electronic device 210 may be configured to apply at least one heuristic to the projected position of the segment line 650 and the longitudinal axis 704 and the transverse axis 702.

Step 914: In Response to the Separation Distance Between the Given One of the Set of Collisions Candidates and the SDC Being Lower Than a Pre-Determined Threshold, Determining That the Given One of the Set of Collision Candidates Would Cause the Collision With the SDC if the SDC Following the Candidate Trajectory The method 900 continues to step 914 with the electronic device 210 configured to, in response to the separation distance (the distance 850) between the given one of the set of collisions candidates and the vehicle 220 being lower than a pre-determined threshold, determine that the given one of the set of collision candidates would cause the collision with the vehicle 220 if the vehicle 220 follows the candidate trajectory 415.

In some embodiments, it is contemplated that the pre-determined threshold may be half of a width of the vehicle 220 and where the width is a largest width of the vehicle 220. In other embodiments, it is contemplated that the electronic device 210 may be configured to use a value for the pre-determined threshold that is equal to the first radius 625 and/or the second radius 615 that the electronic device 210 used for determining the first and second cut off points 620 and 610 during the generation process 600 of FIG. 6.

Step 916: Amending at Least an Associated Given One of the Plurality of Trajectory Points of the Candidate Trajectory to Render a Revised Candidate Trajectory The method 900 continues to step 916 with the electronic device 210 configured to amend at least an associated given one of the plurality of trajectory points (e.g., corresponding to the cell 550) of the candidate trajectory 415 to render a revised candidate trajectory, such that the vehicle 220 following the revised trajectory avoids collisions with dynamic objects on the road segment 400.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for generating a trajectory for a self-driving car (SDC), the SDC being associated with an electronic device, the method executable by the electronic device, the method comprising:

generating, by the electronic device, a candidate trajectory for the SDC, the candidate trajectory for the SDC having a plurality of trajectory points;

for a given one of the plurality of trajectory points:
- determining, by the electronic device, a presence of a plurality of dynamic objects around the SDC at the given one of the plurality of trajectory points;
- applying, by the electronic device, a first algorithm to determine a set of collision candidates, the set of collision candidates being a subset of the plurality of dynamic objects;
  - the set of collision candidates potentially causing a collision with the SDC when the SDC is at the given one of the plurality of trajectory points;
- generating, by the electronic device, a segment line representation of the SDC;
- generating, by the electronic device, a respective bounding box around each of the set of collision candidates;
- for a given one of the set of collision candidates, determining by the electronic device, a distance between the segment line and the respective bounding box to determine a separation distance between the SDC and the given one of the set of collision candidates, the determining the distance including:
  - applying, by the electronic device, a second algorithm to determine a subset of sides of the respective bounding box to analyze; and
  - the determining the distance is based on only the subset of sides of the respective bounding box and the segment line;
- in response to the separation distance between the given one of the set of collisions candidates and the SDC being lower than a pre-determined threshold, determining that the given one of the set of collision candidates would cause the collision with the SDC if the SDC following the candidate trajectory;
- amending, by the electronic device at least the given one of the plurality of trajectory points of the candidate trajectory to render a revised candidate trajectory; and
- controlling, by the electronic device, operation of the SDC using the revised candidate trajectory.

2. The method of claim 1, wherein the pre-determined threshold is half of a width of the SDC.

3. The method of claim 2, wherein the width is a largest width of the SDC.

4. The method of claim 1, wherein the applying the first algorithm comprises applying a grid, the grid having a cell with pre-determined size.

5. The method of claim 4, wherein to determine the set of collision candidates the method further comprises determining the set of collision candidates that are located within a pre-determined number of cells away from a cell associated with the SDC.

6. The method of claim 4, wherein the method further comprises pre-determining the pre-determined size.

7. The method of claim 6, wherein the pre-determining is based on balancing a processing speed and a number of potential false positives.

8. The method of claim 1, wherein the generating the segment line comprises:
- selecting a front point that is a mid-point along a front bumper of the SDC;
- selecting a back point that is the mid-point of a back bumper of the SDC;
- drawing a line through the front point and the back point;
- selecting two cut off points along the line to define the segment line, the cut off points being selected such that a circle with a radius of the pre-determined threshold would encompass each point of the SDC, in the front bumper and the back bumper of the SDC, respectively.

9. The method of claim 1, wherein the applying the second algorithm comprises:
- for the respective bounding box of the given one of the set of collision candidates, determining a coordinate system by:
  - defining a longitudinal axis through a longitudinal midpoint at sides of the respective bounding box and a transverse axis through a transverse midpoint at a front and a back of the respective bounding box;
  - the coordinate system having a zero point at a crossing of the longitudinal axis and the transverse axis.

10. The method of claim 9, wherein the applying the second algorithm further comprises projecting the segment line on the longitudinal axis and the transverse axis to define a projected position of the segment line in the coordinate system.

11. The method of claim 10, further comprising applying at least one heuristic to the projected position and the longitudinal axis and the transverse axis.

12. The method of claim 11, wherein at least one heuristic comprises one of:
- in response to the projected position being entirely on one of: a left side, a right side, a front side, and a back side, the subset of sides of the respective bounding box comprises only the one of the left side, the right side, the front side, and the back side;
- in response to the projected position being inside one of a horizontal corridor and a vertical corridor checking the subset of sides of the respective bounding box comprises a single side of the bounding box;
- in response to the projected position being outside both of the horizontal corridor and the vertical corridor checking the subset of sides of the respective bounding box comprises a single corner of the bounding box;
- in response to the projected position intersecting with an X axis of the system of coordinates, the subset of sides comprises an intersection point of the segment line with the X axis.

13. The method of claim 1, wherein the set of collision candidates is smaller than the plurality of dynamic objects.

14. The method of claim 1, wherein the subset of sides of the respective bounding box is smaller than four.

15. The method of claim 11, wherein the subset of sides of the respective bounding box is two.

16. A computer system for generating a trajectory for a self-driving car (SDC), the SDC being associated with the computer system, the computer system comprising a processor and a memory, the memory comprising executable instructions that, when executed by the processor, cause the computer system:
- generate a candidate trajectory for the SDC, the candidate trajectory for the SDC having a plurality of trajectory points;
- for a given one of the plurality of trajectory points:
  - determine a presence of a plurality of dynamic objects around the SDC at the given one of the plurality of trajectory points;
  - apply a first algorithm to determine a set of collision candidates, the set of collision candidates being a subset of the plurality of dynamic objects;

the set of collision candidates potentially causing a collision with the SDC when the SDC is at the given one of the plurality of trajectory points;

generate a segment line representation of the SDC;

generate a respective bounding box around each of the set of collision candidates;

for a given one of the set of collision candidates, determine a distance between the segment line and the respective bounding box to determine a separation distance between the SDC and the given one of the set of collision candidates, to determine the distance the computer system being configured to:

apply a second algorithm to determine a subset of sides of the respective bounding box to analyze; and to determine the distance is based on only the subset of sides of the respective bounding box and the segment line;

in response to the separation distance between the given one of the set of collisions candidates and the SDC being lower than a pre-determined threshold, determine that the given one of the set of collision candidates would cause the collision with the SDC if the SDC following the candidate trajectory;

amend at least the given one of the plurality of trajectory points of the candidate trajectory to render a revised candidate trajectory; and control operation of the SDC using the revised candidate trajectory.

17. The computer system of claim 16, wherein the pre-determined threshold is half of a width of the SDC.

18. The computer system of claim 17, wherein the width is a largest width of the SDC.

19. The computer system of claim 16, wherein to apply the first algorithm comprises the computer system configured to apply a grid, the grid having a cell with pre-determined size.

20. The computer system of claim 19, wherein to determine the set of collision candidates the computer system is further configured to determine the set of collision candidates that are located within a pre-determined number of cells away from a cell associated with the SDC.

* * * * *